US011413716B2

(12) United States Patent
Motowaki

(10) Patent No.: US 11,413,716 B2
(45) Date of Patent: Aug. 16, 2022

(54) NUT RUNNER DEVICE

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 132 days.

(21) Appl. No.: 17/085,180

(22) Filed: Oct. 30, 2020

(65) Prior Publication Data
US 2021/0154780 A1 May 27, 2021

(30) Foreign Application Priority Data

Nov. 22, 2019 (JP) .............................. JP2019-211230

(51) Int. Cl.
*B23P 19/06* (2006.01)
*B25B 19/00* (2006.01)

(52) U.S. Cl.
CPC .............. *B23P 19/06* (2013.01); *B25B 19/00* (2013.01)

(58) Field of Classification Search
CPC ..... B23P 19/06; B25B 19/00; B25B 23/0007; B25B 21/00; B25B 13/02; B25B 23/00; B25J 15/0019; B08B 5/04
See application file for complete search history.

(56) References Cited

U.S. PATENT DOCUMENTS 5,231,902 A * 8/1993 Uno ........................ B25B 21/00
173/159

FOREIGN PATENT DOCUMENTS

JP         H05337752 A    12/1993

\* cited by examiner

*Primary Examiner* — Lee A Holly
(74) *Attorney, Agent, or Firm* — Karceski IP Law, PLLC

(57) ABSTRACT

A nut runner device includes a main body including spindles, and support portions that support the spindles rotatably around a longitudinal axial line, a detachable unit that is detachably connected to a tip of the main body, and includes a wrench that is disposed coaxially with the spindles and is rotatable integrally with the spindles and an air passage that extends inside of the spindles and the detachable unit in a direction along the longitudinal axial line, and connects a discharge port provided in the spindle, and a suction port that opens to a tip surface of the detachable unit, wherein a tip portion of the wrench is disposed in the suction port, and air that is sucked from the suction port to the discharge port 20c via the air passage passes by the tip portion of the wrench and a fastening member fitted to a tip of the wrench.

6 Claims, 7 Drawing Sheets

NUT RUNNER DEVICE

CROSS-REFERENCE TO RELATED APPLICATIONS

This application is based on and claims the benefit of Japanese Patent Application No. 2019-211230, filed Nov. 22, 2019, the entire content of which is incorporated herein by reference.

FIELD OF THE INVENTION

The present invention relates to a nut runner device.

BACKGROUND OF THE INVENTION

There has been conventionally known an automatic bolt fastening device that is attached to a movable body such as a robot, and fastens a fastening member such as a nut or a bolt to a fastened member (for example, see Japanese Unexamined Patent Application, Publication No. Hei 5-337752).

The automatic bolt fastening device of Japanese Unexamined Patent Application, Publication No. Hei 5-337752 is configured such that a unit including a suction member that sucks and holds a bolt and a bit that engages with a head portion of the bolt is attachable to and detachable from a main body of the fastening device, and can respond to a plurality of types of bolts having different head portion sizes by replacement of the unit. Further, the automatic bolt fastening device in Japanese Unexamined Patent Application, Publication No. Hei 5-337752 holds a bolt by vacuum suction. Vacuum suction can hold a fastening member without magnetizing the fastening member, and therefore is suitable for holding a fastening member that should not be magnetized.

SUMMARY OF THE INVENTION

One aspect of the present disclosure is a nut runner device including a main body including a spindle, and a support portion that supports the spindle rotatably around a longitudinal axial line of the spindle, a detachable unit that is detachably connected to a tip of the main body, and includes a wrench that is disposed coaxially with the spindle and is rotatable integrally with the spindle, and an air passage that extends inside of the spindle and the detachable unit in a direction along the longitudinal axial line, and connects a discharge port provided in the spindle, and a suction port that opens to a tip surface of the detachable unit, wherein a tip portion of the wrench is disposed in the suction port, and air that is sucked from the suction port to the discharge port via the air passage passes by the tip portion of the wrench and a fastening member that is fitted to a tip of the wrench.

DESCRIPTION OF EMBODIMENT(S) OF THE INVENTION

Hereinafter, a nut runner device 100 according to one embodiment will be described with reference to the drawings.

The nut runner device 100 is to fasten a fastening member S such as a nut or a bolt to a fastened member such as a workpiece. The nut runner device 100 is attached to a movable part that is movable, and is moved by movement of the movable part. In the present embodiment, the movable part is a robot arm of an industrial robot such as a vertical articulated robot, and the nut runner device 100 is attached to a tip of the robot arm as a tool. The movable part may be an industrial machine other than the robot arm.

Figure 1:
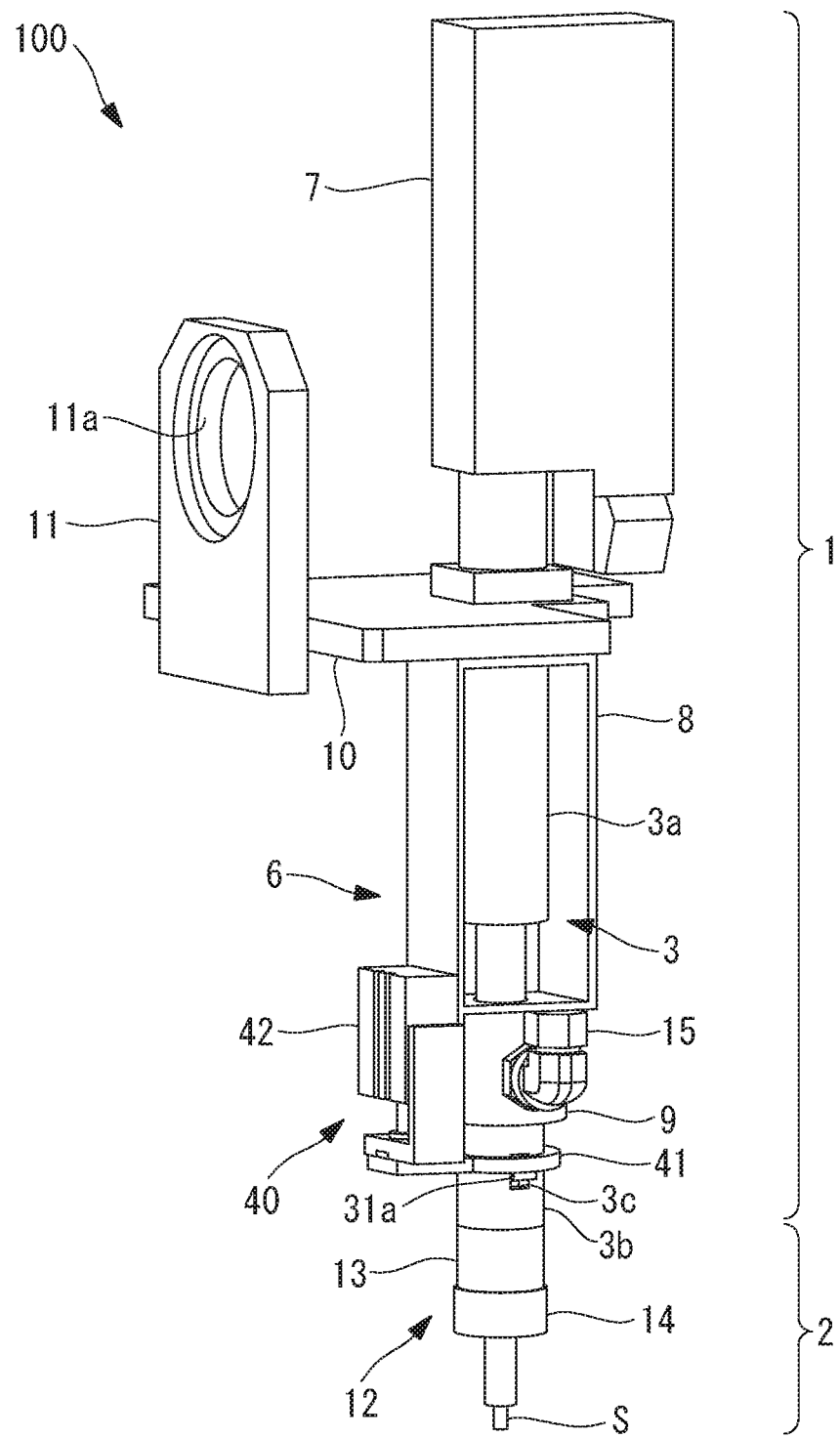
FIG. 1 is an appearance view illustrating a configuration of a nut runner device according to one embodiment.

As illustrated in FIG. 1, the nut runner device 100 includes a main body 1 having a spindle 3 and a motor (not illustrated), and a detachable unit 2 that is detachably connected to a tip of the main body 1. The detachable unit 2 has a wrench 4 (see FIG. 3) that is disposed coaxially with the spindle 3 and is fitted to the fastening member S, and is connected to the main body 1 by a connection mechanism 30 described later so that the wrench 4 rotates integrally with the spindle 3.

Figure 2:
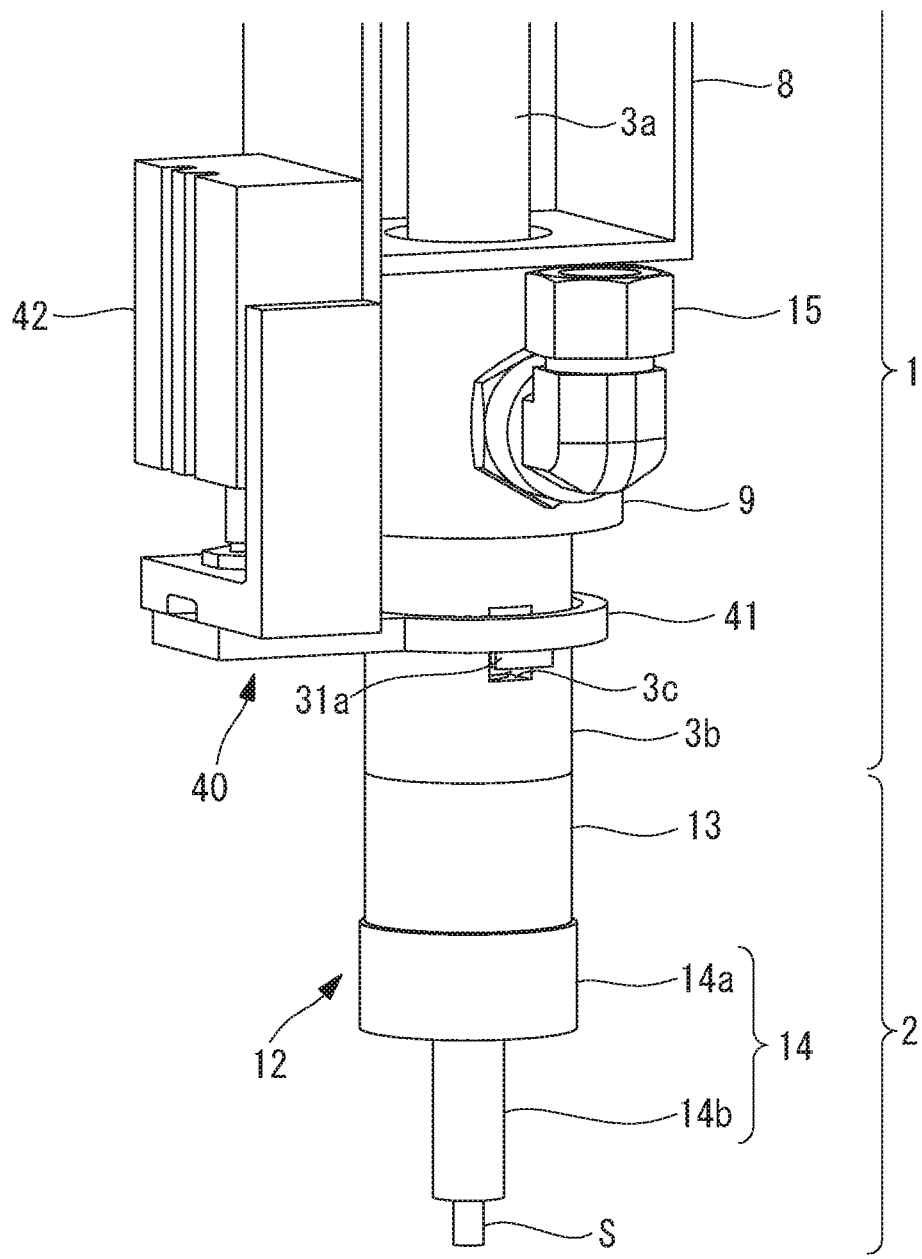
FIG. 2 is a partial enlarged view of the nut runner device in FIG. 1.
Figure 3:
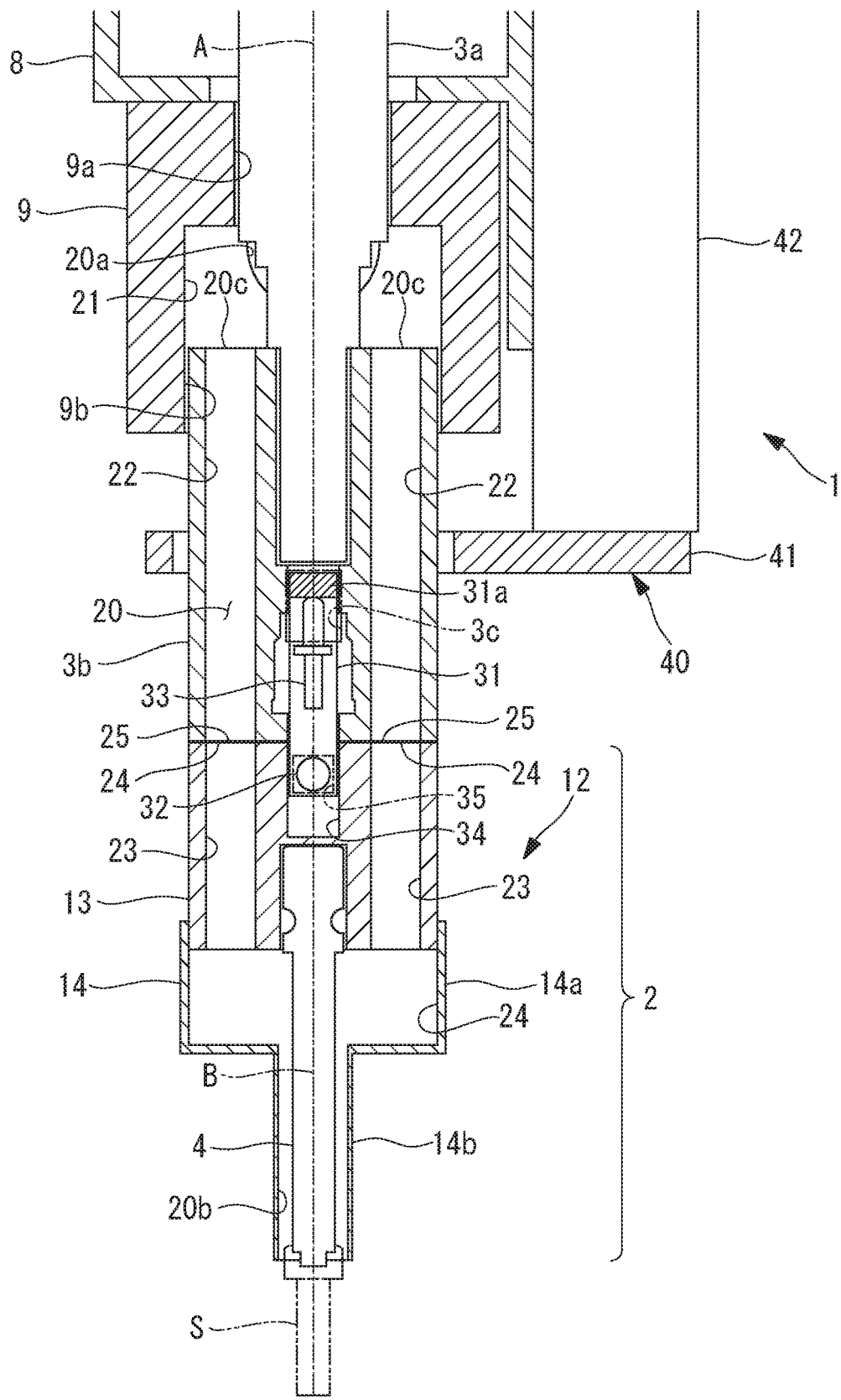
FIG. 3 is a partial vertical sectional view of the nut runner device in FIG. 1.

FIG. 2 is an enlarged view of a tip portion of the nut runner device 100, and FIG. 3 is a vertical sectional view of the tip portion of the nut runner device 100 along a longitudinal axial line A of the spindle 3.

The spindle 3 has a drive shaft 3a, and a joint portion 3b in a circular-columnar shape that is provided at a tip of the drive shaft 3a coaxially with the drive shaft 3a. As illustrated in FIG. 3, the tip portion of the drive shaft 3a is accommodated in a base end portion of the joint portion 3b, and is fixed to the base end portion of the joint portion 3b. A motor accommodated in a motor box 7 is connected to a base end of the drive shaft 3a, and the spindle 3 is rotated around the longitudinal axial line A by the motor.

The joint portion 3b is a portion for connecting the main body 1 to the detachable unit 2, and for providing a part of an air passage 20 described later in the spindle 3. The joint portion 3b has a larger diameter than a diameter of the tip portion of the drive shaft 3a, and has an annular base end surface disposed on an outside in a radial direction of the drive shaft 3a.

The main body 1 has a support portion 6 that supports the spindle 3 rotatably around the longitudinal axial line A.

The support portion 6 has a box-shaped frame 8, and a circular-cylindrical air connection portion 9 that is disposed coaxially with the longitudinal axial line A between the frame 8 and the joint portion 3b and is fixed to a tip of the frame 8, and the drive shaft 3a penetrates through the frame 8 and the air connection portion 9.

To the frame 8, a robot attaching portion 11 for attaching the nut runner device 100 to a tip of the robot arm is fixed via a plate-shaped coupling member 10. For example, the robot attaching portion 11 has an attaching hole 11a in which a tip portion of the robot arm fits.

As illustrated in FIG. 3, the air connection portion 9 is disposed around the drive shaft 3a, and forms a space 21 that is adjacent to the base end surface of the joint portion 3b and is a part of the air passage 20, between the air connection portion 9 and the drive shaft 3a. The drive shaft 3a penetrates an opening portion 9a at a base end portion of the air connection portion 9, and a base end portion of the joint portion 3b is accommodated in an opening portion 9b at a tip portion of the air connection portion 9. The space 21 is an annular or circular-cylindrical space that continues around the longitudinal axial line A, and is between an outer peripheral surface of the drive shaft 3a and an inner peripheral surface of the air connection portion 9.

The detachable unit 2 has a housing 12 that accommodates the wrench 4 therein, and is connected to the joint portion 3b by a connection mechanism 30 described later. In a state where the detachable unit 2 is connected to the main body 1, the entire detachable unit 2 rotates integrally with the spindle 3.

The wrench 4 is a socket wrench, a hexagonal wrench or the like, and a tip of the wrench 4 has a shape and a size corresponding to a type and a size of a head portion of the fastening member S. In the present embodiment, a plurality of detachable units 2 having the wrenches 4 with shapes, sizes and the like of tip ends differing from one another are prepared. The plurality of detachable units 2 have a common structure except for the wrench 4, and can be connected to the common main body 1.

The housing 12 has a central axial line B corresponding to an extension line of the longitudinal axial line A in the state where the detachable unit 2 is connected to the main body 1. The wrench 4 is disposed coaxially with the central axial line B of the housing 12, and the tip of the wrench 4 is disposed in a tip or a vicinity of the tip of the housing 12.

Specifically, the housing 12 has a first housing 13 that is connected to the joint portion 3b, and a second housing 14 that is disposed at a tip side of the first housing 13 to be fixed to the first housing 13.

Figure 4:
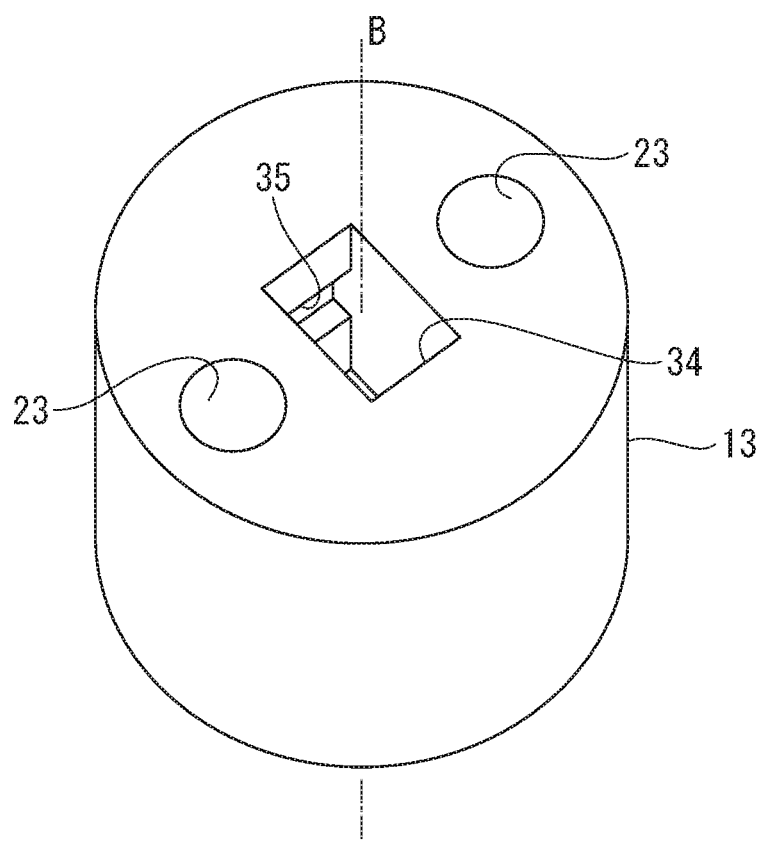
FIG. 4 is a perspective view of a first housing of detachable unit.
Figure 5:
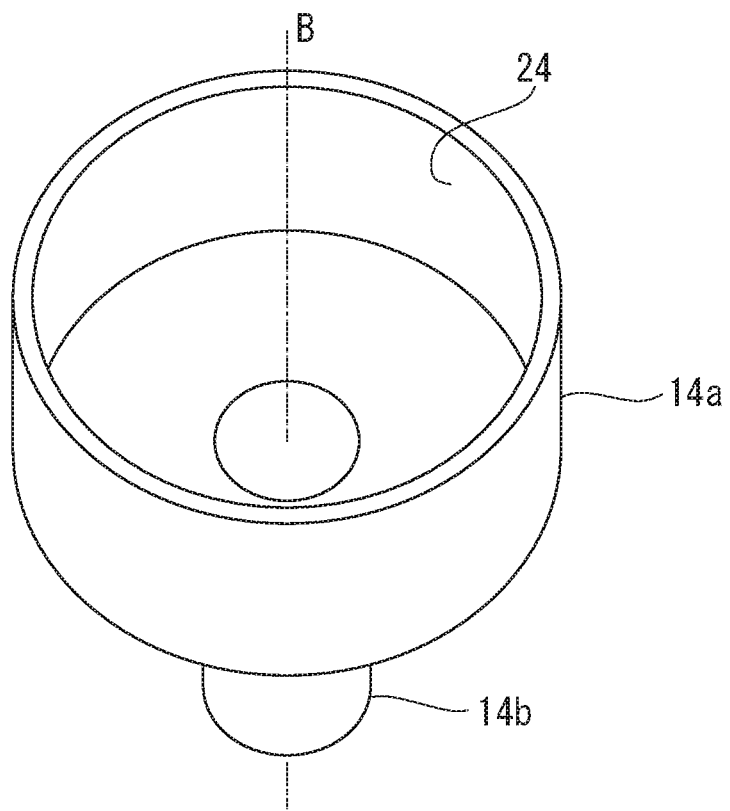
FIG. 5 is a perspective view of a second housing of the detachable unit.

As illustrated in FIG. 4, the first housing 13 is a circular-columnar member disposed coaxially with the central axial line B, and a base end portion of the wrench 4 is fixed to the first housing 13. As illustrated in FIG. 5, the second housing 14 is a tubular member that is disposed coaxially with the central axial line B and opens in both ends. For example, by screwing a tip portion of the first housing 13 to an inside of a base end portion of the housing 14, the housings 13 and 14 are fixed to each other.

The second housing 14 has a large diameter portion 14a, and a small diameter portion 14b disposed at a tip side of the large diameter portion 14a and having a smaller outside diameter than an outside diameter of the large diameter portion 14a, and a tip portion of the wrench 4 is disposed inside of the small diameter portion 14b. Inside diameters of the large diameter portion 14a and the small diameter portion 14b are larger than an outside diameter of the wrench 4, and a circular-cylindrical space forming a part of the air passage 20 described later is formed between inner peripheral surfaces of the large diameter portion 14a and the small diameter portion 14b, and an outer peripheral surface of the wrench 4. Further, a space of a relatively large volume having a large transverse sectional area as compared with the small diameter portion 14b is formed inside of the large diameter portion 14a.

Further, as illustrated in FIG. 3, the nut runner device 100 includes the air passage 20 that connects a connection port 20a that opens to an outer surface of the air connection portion 9 to continue to the space 21 and a suction port 20b that opens to a tip surface of the detachable unit 2, in the state where the detachable unit 2 is connected to the main body 1.

The suction port 20b is formed of the circular-cylindrical space between an outer peripheral surface of the tip portion of the wrench 4 and the inner peripheral surface of the small diameter portion 14b. In the base end surface of the joint portion 3b, a discharge port 20c that opens to the space 21 inside of the air connection portion 9 is formed. The air passage 20 extends in a direction along the longitudinal axial line A inside of the joint portion 3b and the detachable unit 2, and connects the discharge port 20c to the suction port 20b.

An intake device that sucks air is connected to the connection port 20a via a joint 15. The intake device is a device having a large intake air flow rate such as a vacuum flow. For example, the intake air flow rate of the intake device is 100 L/min or more, and is preferably 500 L/min or more. By a large intake air flow rate like this, air is sucked into the suction port 20b at a large flow rate, and a suction force occurs to the suction port 20b. The intake device may be provided as a part of the nut runner device 100.

The air passage 20 is configured so that connection of the connection port 20a and the suction port 20b is also maintained while the spindle 3 and the detachable unit 2 are rotating.

Specifically, the air passage 20 has a first portion that is the space 21 inside of the air connection portion 9, a second portion 22 provided inside of the joint portion 3b, a third portion 23 provided inside of the first housing 13, and a fourth portion 24 provided inside of the second housing 14.

The second portion 22 is configured by a plurality of branch passages that are arranged in a circumferential direction around the longitudinal axial line A, and respectively penetrate through the joint portion 3b in a direction parallel with the longitudinal axial line A. Each of the plurality of branch passages communicates with the first portion 21, and communication of each of the branch passages with the first portion 21 also continues to be maintained while the joint portion 3b is rotating with respect to the air connection portion 9.

The third portion 23 is configured by a plurality of branch passages that are arranged in a circumferential direction around the central axial line B, and respectively penetrate through the first housing 13 in a direction parallel with the central axial line B. A plurality of branch passages of the third portion 23 are provided at positions respectively corresponding to the plurality of branch passages of the second portion 22, and the plurality of branch passages of the third portion 23 respectively communicate with the plurality of branch passages of the second portion 22, in the state where the detachable unit 2 is connected to the main body 1.

The fourth portion 24 is a space that is configured by a cylindrical space between an outer peripheral surface of the wrench 4 and an inner peripheral surface of the second housing 14, and continues throughout an entire circumference in a circumferential direction around the central axial line B. The suction port 20b is configured by a tip portion of the fourth portion 24. The plurality of branch passages of the third portion 23 communicate with the fourth portion 24.

Here, an inside diameter of the small diameter portion 14b is larger than an outside diameter of the tip portion of the wrench 4 and an outside diameter of the head portion of the fastening member S that is fitted to the tip of the wrench 4. Accordingly, in the state where the head portion of the fastening member S is fitted to the tip of the wrench 4, the suction port 20b is not completely closed by the fastening member S, but at least a peripheral edge portion of the suction port 20b opens. Thereby, in the state where the head portion of the fastening member S is fitted to the tip of the wrench 4, air that is sucked from the suction port 20b to the discharge port 20c passes by the tip portion of the wrench 4 and the fastening member S, and the air continues to be sucked into the suction port 20b at a large flow rate.

Further, the nut runner device 100 includes the connection mechanism 30 that is provided at the joint portion 3b and the first housing 13, and connects the detachable unit 2 to the main body 1 so that the wrench 4 rotates integrally with the spindle 3, and a release mechanism 40 that is provided at the main body 1 and releases connection of the detachable unit 2 with the main body 1 by the connection mechanism 30.

Figure 6:
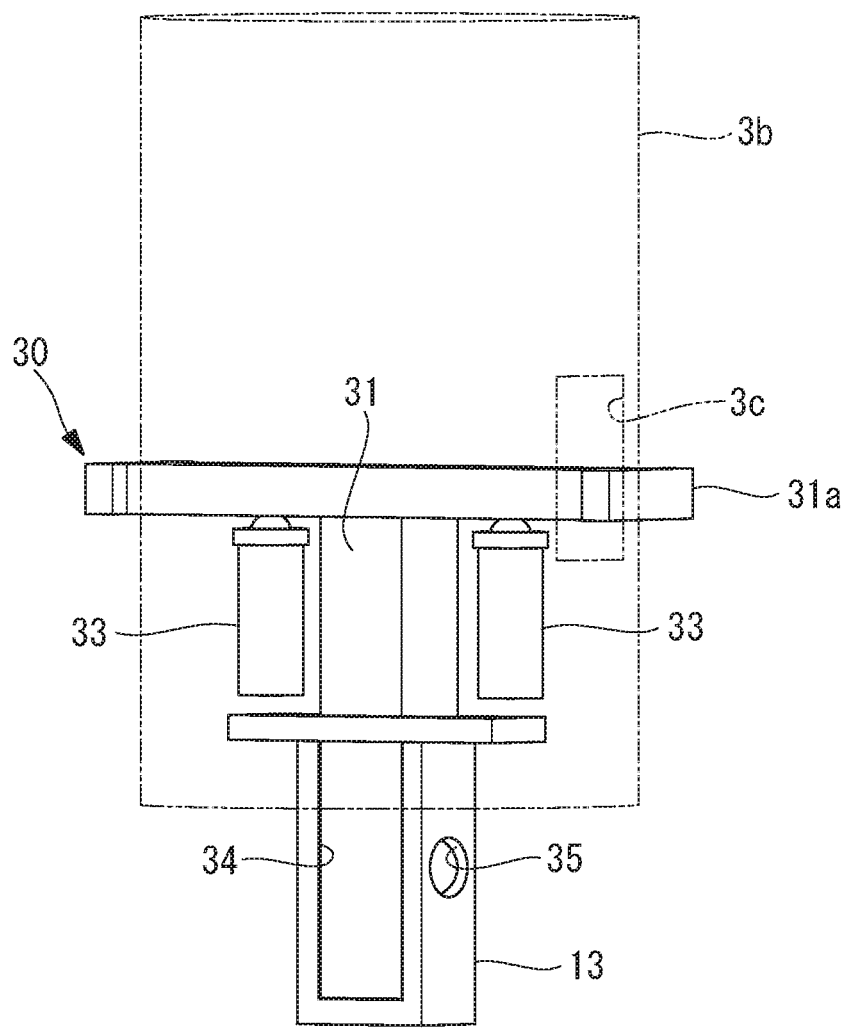
FIG. 6 is a configurational view of a connection mechanism, and is a view explaining detachment of the detachable unit from a main body.
Figure 7:
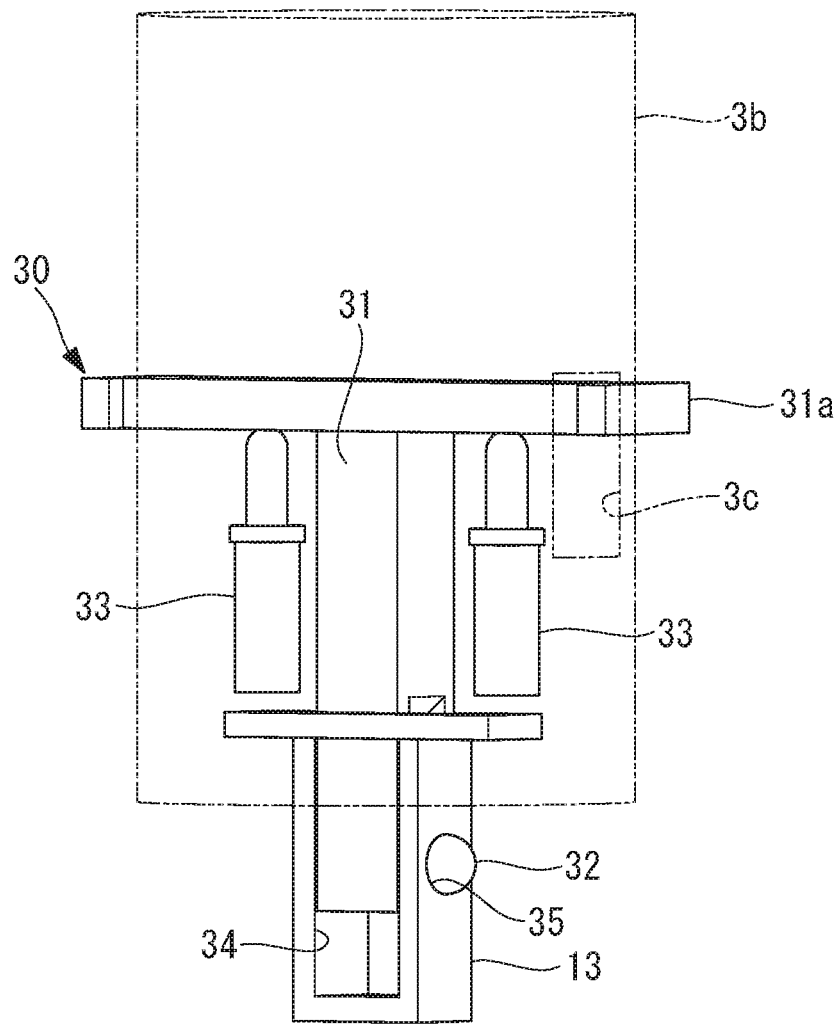
FIG. 7 is a configurational view of the connection mechanism, and is a view explaining connection of the detachable unit with the main body.

Specifically, as illustrated in FIG. 6 and FIG. 7, the connection mechanism 30 has a movable member 31, a ball 32 and urging members 33 that are provided in the joint portion 3b, and a fitting hole 34 and a ball engaging groove 35 that are provided in the first housing 13.

The release mechanism 40 has a pressing plate 41 and an air cylinder 42.

The movable member 31 is disposed inside of the joint portion 3b along the longitudinal axial line A, and a tip portion of the movable member 31 protrudes from a tip surface of the joint portion 3b. The movable member 31 is provided to be movable along the longitudinal axial line A with respect to the joint portion 3b, and not to rotate around the longitudinal axial line A with respect to the joint portion 3b. A handle 31a extending in a direction orthogonal to the longitudinal axial line A is provided at a base end of the movable member 31, and the handle 31a extends to outside of the joint portion 3b through a window 3c formed in a side wall of the joint portion 3b. The window 3c extends in a direction along the longitudinal axial line A, and allows movement of the movable member 31 between a lock position and an unlock position lower than the lock position.

The ball 32 is held in the tip portion of the movable member 31 to be able to protrude and retract in the direction orthogonal to the longitudinal axial line A, and is urged in a direction to protrude from the tip portion of the movable member 31 by an urging member such as a spring not illustrated.

The urging member 33 is, for example, a spring plunger, and urges the handle 31a to the lock position.

The fitting hole 34 opens to a base end surface of the first housing 13, and the tip portion of the movable member 31 fits into the fitting hole 34. Transverse sections of the tip portion of the movable member 31 and the fitting hole 34 in the direction orthogonal to the axial lines A and B are non-circular, and relative rotation around the axial lines A and B of the joint portion 3b and the detachable unit 2 is inhibited by fitting of the tip portion of the movable member 31 into the fitting hole 34.

On an inner surface of the fitting hole 34, the ball engaging groove 35 that is recessed outward in a radial direction and receives the ball 32 in the radial direction is formed. As illustrated in FIG. 7, in a state where the handle 31a is disposed in the lock position, the ball 32 protrudes into the ball engaging groove 35 to engage with the ball engaging groove 35 in the direction along the longitudinal axial line A. Thereby, the detachable unit 2 is connected to the main body 1. Further, by movement of the handle 31a from the lock position to the unlock position, the ball 32 is pressed by the inner surface of the fitting hole 34 to retract into the movable member 31, and engagement of the ball 32 with the ball engaging groove 35 is released, as illustrated in FIG. 6. Thereby, connection of the detachable unit 2 and the main body 1 is released.

The pressing plate 41 is disposed outside of the joint portion 3b, and is disposed on a base end surface of the handle 31a. The air cylinder 42 is supported by the support portion 6, and is connected to the pressing plate 41. The air cylinder 42 moves the pressing plate 41 toward a tip side by supply of compressed air from an air source (not illustrated) such as an air compressor, and thereby moves the handle 31a from the lock position to the unlock position against an urging force of the urging member 33. Thereby, connection of the detachable unit 2 with the main body 1 can be released. Further, the air cylinder 42 moves the pressing plate 41 to a base end side by discharge of air, and thereby moves the handle 31a from the unlock position to the lock position following the urging force of the urging member 33. Supply of air to the air cylinder 42 and discharge of the air from the air cylinder 42 are controlled by a control device that controls an industrial robot, for example.

Next, an operation of the nut runner device 100 will be described.

The nut runner device 100 moves to a predetermined place where one or a plurality of fastening members S are disposed by an operation of the robot arm, and a tip of the detachable unit 2 is positioned to a vicinity of the fastening member S. Next, an inside of the air passage 20 is sucked at a large flow rate by an operation of the intake device, and a strong suction force occurs to the suction port 20b by a flow of the air at a large flow rate going toward the suction port 20b. By the strong suction force, the fastening member S is attracted to the tip of the wrench 4 and the head portion of the fastening member S is fitted to the tip of the wrench 4.

In the state where the head portion of the fastening member S is fitted to the tip of the wrench 4, air continues to pass by the tip portion of the wrench 4 and the fastening member S and to be sucked at a large flow rate from the suction port 20b to the air connection port 20a, and the strong suction force continues to occur to the suction port 20b. By the suction force, the fastening member S is fixed to the tip of the wrench 4.

Next, the nut runner device 100 that holds the fastening member S moves to another place where the fastened member is disposed by an operation of the robot arm. Subsequently, by an operation of the motor, the spindle 3 and the detachable unit 2 integrally rotate around the axial lines A and B, and the fastening member S is fastened to the fastened member.

When another type of fastening member S is fastened, replacement of the detachable unit 2 that is connected to the main body 1 is automatically executed by the robot control device controlling the release mechanism 40, for example.

Specifically, the air cylinder 42 moves the handle 31a from the lock position to the unlock position by supply of air. Thereby, engagement of the ball 32 with the ball engaging groove 35 is released, and the detachable unit 2 is separated from the main body 1.

Next, by an operation of the robot arm, the main body 1 moves to another detachable unit 2, and approaches the other detachable unit 2 while slowly rotating around the longitudinal axial line A. Thereby, the tip portion of the movable member 31 that protrudes from the tip surface of the joint portion 3b is inserted into the fitting hole 34 of the other detachable unit 2. Subsequently, the ball 32 engages with the ball engaging groove 35, and thereby the other detachable unit 2 is connected to the main body 1.

In this way, according to the present embodiment, in the state where the fastening member S is fitted to the tip of the wrench 4, air is sucked at a large flow rate by passing by the tip portion of the wrench 4 and the fastening member S, and the fastening member S is fixed to and held by the wrench 4 by the suction force by the flow of the air at the large flow rate. Accordingly, unlike the case where the fastening member S is held by vacuum suction, a strong suction force can be stably exhibited regardless of reduction in airtightness of the air passage 20, and the fastening member S can be stably held and conveyed.

Further, when a fastening member is held by vacuum suction, it is necessary to realize a high vacuum degree of the flow path of air, and for this purpose, it is necessary to provide seal members that hermetically close the flow path in various sites of the nut runner device. In contrast to this, in the case of the nut runner device 100 of the present embodiment, a suction force can be exhibited regardless of the vacuum degree of the air passage 20, and therefore a seal member for hermetically closing the air passage 20 is not required. Accordingly, the structure of the nut runner device 100 can be simplified, and cost of the nut runner device 100 can be reduced.

For example, in the present embodiment, there may be a gap between the inner peripheral surface of the opening portion 9a and the outer peripheral surface of the drive shaft 3a, and there may be a gap between the inner peripheral surface of the opening portion 9b and the outer peripheral surface of the base end portion of the joint portion 3b. In other words, seal members for hermetically closing the first portion 21 inside of the air connection portion 9 do not have to be provided in these gaps. In order to suppress reduction in the suction flow rate of the air in the suction port 20b by inflow of the air to the air passage 20 via these gaps, these gaps are preferably very small, and distances of the gaps in the direction along the longitudinal axial line A are preferably ensured to be sufficiently long.

Further, a plurality of detachable units 2 with the types of the wrenches 4 differing from one another, and the structures of the housings 12 being same as one another are prepared, and the plurality of detachable units 2 are alternatively attachable to and detachable from the main body 1 by the connection mechanism 30. Accordingly, many types of fastening members S can be automatically handled and fastened by using the single main body 1, and it is not necessary to prepare a different nut running device for each type of fastening member S.

Further, the detachable unit 2 has a compact and simple structure, and in particular, the small diameter portion 14b of the second housing 14 disposed in the vicinity of the fastening member S has a simple structure with a small diameter. Accordingly, interference between the nut runner device 100 and the fastening member S can be prevented, and the cost of the detachable unit 2 can be reduced.

Further, between the plurality of branch passages of the third portion 23 and the suction port 20b, the large space between the inner peripheral surface of the large diameter portion 14a and the outer peripheral surface of the wrench 4 is provided, and thereby the suction force in the suction port 20b can be made uniform. For example, if the plurality of branch passages of the third portion 23 are directly connected to the passage in the small diameter portion 14b, a spatial deviation of the suction force occurs to the suction port 20b. In contrast to this, according to the present embodiment, a suction flow rate is made spatially uniform in the large space in the large diameter portion 14a, and thereby the spatial deviation of the suction force in the suction port 20b can be prevented.

In the present embodiment, the air passage 20 is configured by the first portion 21, the second portion 22, the third portion 23 and the fourth portion 24, but the specific configuration of the air passage 20 is not limited to this, and can be arbitrarily changed as long as connection of the connection port 20a and the suction port 20b can be maintained during rotation of the spindle 3 and the detachable unit 2.

In the present embodiment, the release mechanism 40 includes the air cylinder 42 that is driven by the air pressure, but instead of this, the release mechanism 40 may include a drive mechanism driven by electric power, for example, an electric cylinder. Further, the release mechanism 40 may be provided at the detachable unit 2 instead of the main body 1.

The invention claimed is:

1. A nut runner device, comprising:
a main body including a spindle, and a support portion that supports the spindle rotatably around a longitudinal axial line of the spindle;
a detachable unit that is detachably connected to a tip of the main body, and includes a wrench that is disposed coaxially with the spindle and is rotatable integrally with the spindle; and
an air passage that extends inside of the spindle and the detachable unit in a direction along the longitudinal axial line, and connects a discharge port provided in the spindle, and a suction port that opens to a tip surface of the detachable unit,
wherein a tip portion of the wrench is disposed in the suction port, and
air that is sucked from the suction port to the discharge port via the air passage passes by the tip portion of the wrench and a fastening member that is fitted to a tip of the wrench.

2. The nut runner device according to claim 1,
wherein the spindle includes a drive shaft and a columnar joint portion provided at a tip of the drive shaft, the discharge port being formed in a base end surface of the joint portion,
the support portion includes an air connection portion that is disposed around the spindle, and forms a space to which the discharge port opens, between the spindle and the air connection portion,
the air passage includes a first portion provided in the air connection portion, and a second portion provided in the joint portion,
the first portion is configured by the space, and
the second portion is configured by a plurality of branch passages that are arranged in a circumferential direction around the longitudinal axial line and respectively penetrate the joint portion in a direction parallel with the longitudinal axial line.

3. The nut runner device according to claim 2,
wherein the detachable unit includes a columnar first housing that is disposed coaxially with the longitudinal axial line and holds a base end portion of the wrench, and a second housing that is disposed coaxially with the longitudinal axial line and is fixed to a tip of the first housing, the first housing and the second housing accommodating the wrench inside the first housing and the second housing,
the air passage includes a third portion provided in the first housing, and a fourth portion provided in the second housing,
the third portion is configured by a plurality of branch passages that are arranged in the circumferential direction around the longitudinal axial line and respectively penetrate the first housing in the direction parallel with the longitudinal axial line, the plurality of branch passages of the third portion respectively communicating with the plurality of branch passages of the second portion, and the fourth portion is configured by a cylindrical space between an outer peripheral surface of the wrench and an inner peripheral surface of the second housing.

4. The nut runner device according to claim 3, wherein the second housing includes a large diameter portion, and a small diameter portion that is disposed at a tip side of the large diameter portion and has a smaller outside diameter than an outside diameter of the large diameter portion.

5. The nut runner device according to claim 1, comprising an intake device that is connected to a connection port that opens to an outer surface of the support portion, and sucks air at a flow rate of 100 L/min or more.

6. The nut runner device according to claim 1, comprising:

a connection mechanism that connects the detachable unit to the main body so that the wrench rotates integrally with the spindle; and a release mechanism that releases connection of the detachable unit with the main body by the connection mechanism, wherein the release mechanism is driven by air pressure or electric power.

* * * * *